(No Model.)

H. A. GOREHAM.
CONDUIT ELECTRIC RAILWAY.

No. 517,692. Patented Apr. 3, 1894.

Witnesses
Helen Graham
William Graham

Inventor
H. A. Goreham
By his attorney
L. P. Graham

UNITED STATES PATENT OFFICE.

HERBERT A. GOREHAM, OF DECATUR, ILLINOIS.

CONDUIT ELECTRIC RAILWAY.

SPECIFICATION forming part of Letters Patent No. 517,692, dated April 3, 1894.

Application filed August 14, 1893. Serial No. 483,077. (No model.)

*To all whom it may concern:*

Be it known that I, HERBERT A. GOREHAM, of Decatur, in the county of Macon and State of Illinois, have invented certain new and useful Improvements in Conduits for Trolley-Wires, of which the following is a specification.

This invention is designed to protect underground trolley wires from contact with water, and it consists in the details of construction and combinations of parts hereinafter set forth and claimed.

Figure 1:
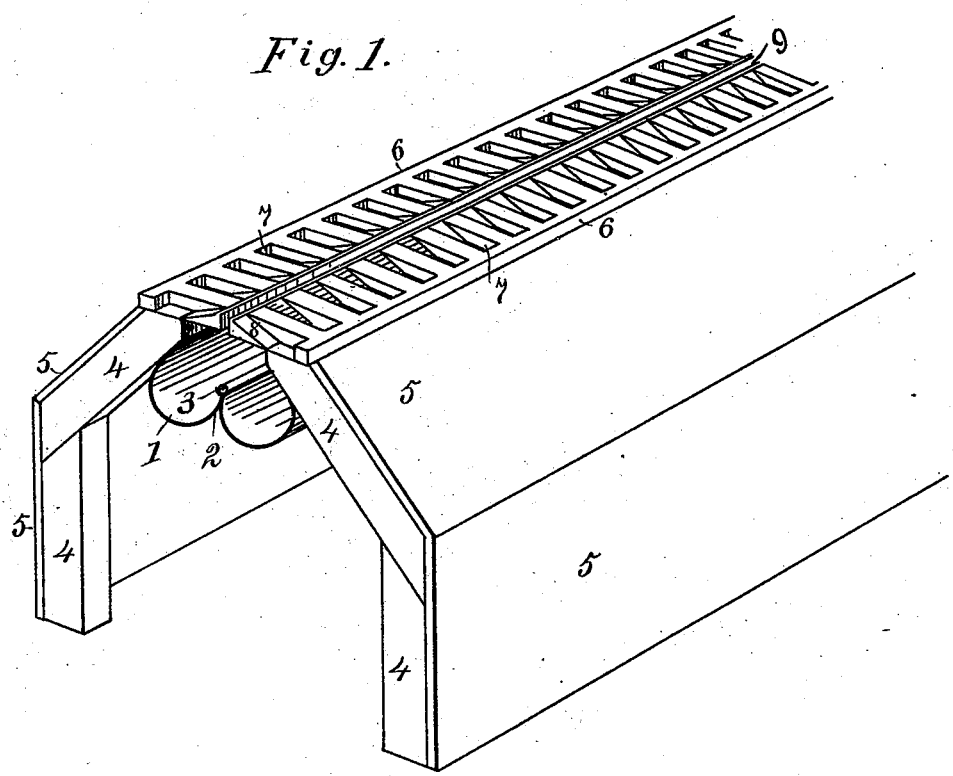
Figure 2:
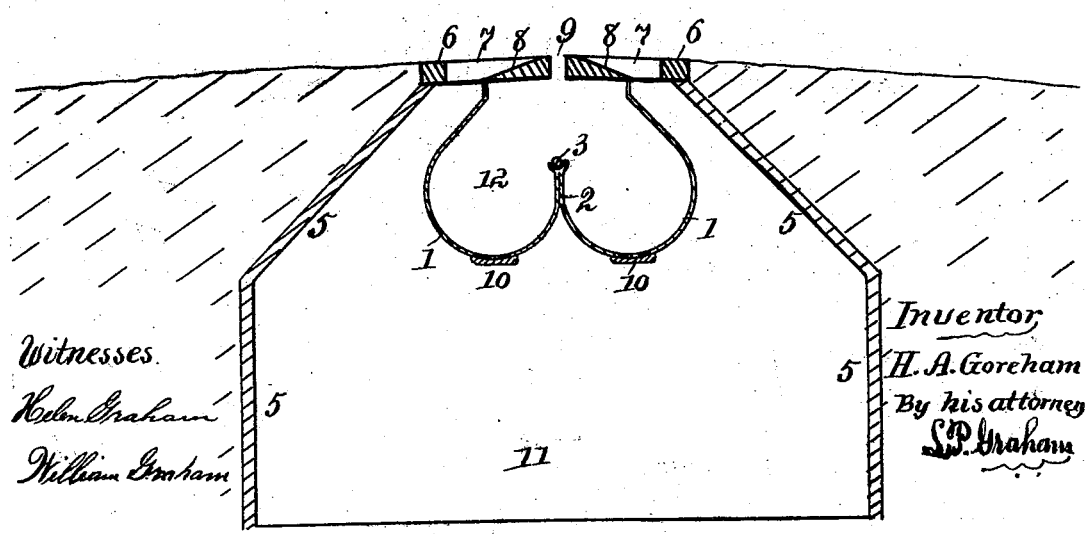

In the drawings forming part of this specification Figure 1 is a perspective representation of a segment of conduit embodying the principles of my invention, and Fig. 2 is a section through the conduit between frame supports.

The trolley wire 3 is supported on the raised center 2 of the metal conduit 1. Suitable frames, as 4, placed at suitable intervals support the conduit and carry top and sides 5 of the trench 11, in which the conduit is placed. Grates 6 are placed on the supporting frames, above the conduit, and sufficiently far apart to form slot 9 for the trolley arm. Each grate has slots 7 opening into the trench beyond the conduit, and beveled as at 8, above the conduit, to carry water to the slots. The conduit is provided, at suitable intervals, with valves, as 10, which are normally closed, which open downward to permit the escape of water from the conduit, and which close upward to exclude water from the trench entering the conduit. The trench is formed, in any suitable manner, between the rails of a car track, the conduit is supported in the upper portion of the trench, and the grates are secured above the conduit substantially as shown, and approximately on a level with the surrounding grade. With the exception of the small quantity that may pass through the slot 9, all water falling or accumulating on the grates is carried down inclines 8 and through slots 7 to the trench, which may be sewered in a proper manner. The water entering the conduit through the slot accumulates in the lower portion of the conduit, and escapes through the valves, without interfering with the operation of the elevated trolley wire. If in an emergency the trench should be over-taxed with water, the valves will be held closed by the pressure and the water will be excluded from the conduit and the trolley wire.

I do not attach much importance to the construction of the trench, so far as my invention is concerned, except that it shall be sufficient to carry all water that may accumulate in the vicinity of the grate, but it is essential that the conduit shall extend along the upper portion of the trench, that the wire shall be elevated above the bottom of the conduit, that there shall be valves in the bottom of the conduit for the escape of water from the conduit and exclusion of water from the trench, and that the grates shall be constructed and arranged to gather the water accumulating near the trolley slot and convey the same to the trench. The wire 3 is laid along a groove in central rib 2, thereby obtaining a permanent position, and is suitably insulated in such groove.

Having thus described my invention, I claim as new and desire to secure by Letters Patent—

A conduit for the trolley wires of electric cars, comprising a trench, a conduit extending along the upper portion of the trench, a central rib, or upward extension, in the conduit, supporting, and insulated from, the trolley wire, slotted grates covering the conduit and communicating with the trench, such grates being separated sufficiently to form a slot for the trolley, and valves in the lower surfaces of the conduit, substantially as set forth.

In testimony whereof I sign my name in the presence of two subscribing witnesses.

HERBERT A. GOREHAM.

Attest:
L. P. GRAHAM,
EDWIN F. KUNY.